United States Patent Office 3,542,791
Patented Nov. 24, 1970

1

3,542,791
2-PHENYL-3-(3-QUINUCLIDINYLAMINO)-
PROPIOPHENONES
Robert Bruce Moffett, Kalamazoo, Mich., assignor to The
Upjohn Company, a corporation of Delaware
No Drawing. Filed July 25, 1968, Ser. No. 747,426
Int. Cl. C07d 39/06
U.S. Cl. 260—294.7                                2 Claims

ABSTRACT OF THE DISCLOSURE

This invention relates to novel 2-phenyl-3-(3-quinuclidinylamino)-propiophenones; it is inclusive of the free base and acid addition salt forms of the compounds embraced by the formula

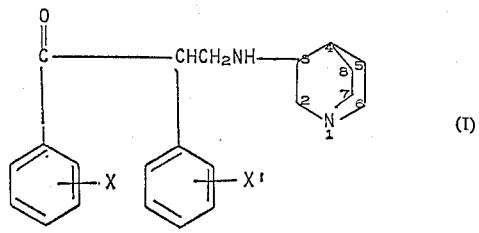

(I)

wherein X and X' are selected from the group consisting of hydrogen, lower-alkyl, fluorine, chlorine and bromine.

As used in this specification, the term "lower-alkyl" means alkyl of from one through four carbon atoms, e.g., methyl, ethyl, propyl, butyl and isomeric forms thereof.

The compounds of Formula I are CNS stimulants; they antagonize convulsions and prevent death resulting from the administration of nicotine.

BRIEF SUMMARY OF THE INVENTION

The novel compounds embraced by Formula I exist either in the non-protonated (free base) form or in the protonated (acid addition salt) form, depending on the pH of the environment. They form stable protonates, i.e., acid addition salts, on reacting the free base with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric and lactic acids, and the like. They form both mono- and di-acid addition salts, depending on whether only one basic moiety, or both, is neutralized.

The novel 2-phenyl - 3 - (3-quinuclidinylamino)-propiophenones of Formula 1 are prepared by mixing a corresponding 2-phenylacrylophenone of the formula

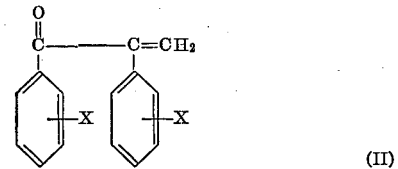

(II)

wherein X and X' have the same meaning as above, with 3-aminoquinuclidine of the formula

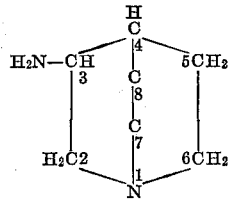

(III)

or an acid addition salt thereof.

2

2-phenylacrylophenones (II) are known in the art and can be prepared in the manner describeed in Bull. Soc. Chim. France 1176 (1963).

3-aminoquinuclidine (III) and its acid addition salts can be prepared in accordance with the procedure set forth in J. Amer. Chem. Soc. 74, 2215 (1952).

In carrying out the reaction between the acrylophenones (II) and 3-aminoquinuclidine (III) (or an acid addition salt thereof), the two reactants are merely mixed. When the acid addition salt form (III) is employed, it is mixed with the propiophenone (II) in the presence of an acid acceptor (e.g., triethylamine, picoline or pyridine). Inert solvents such as an alkanol (e.g., methanol or ethanol) can be employed, if desired. Heating of the reaction mixture is not necessary. The molecular ratio of the compounds of Formula II and Formula III can be varied, substantially equimolar ratios having been found satisfactory. The time required for the completion of the reaction depends upon such factors as the particular reactants, their solubility, their relative amounts, thoroughness of mixing, and the like. Therefore, it will be understood that the optimum reaction time will vary for each set of reaction conditions. Ordinarily, reaction times ranging from about several hours to about ten days are suitable. After completion of the reaction between the compounds of Formula II and Formula III, the product (I) is isolated from the reaction mixture in its free base form, using conventional procedures such as filtration, solvent evaporation, solvent extraction, chromatography or crystallization, or a combination of these methods. The free bases so obtained can be purified, e.g., by recrystallization from a solvent or suitable mixture of solvents. The free base form can be converted to any acid addition salt by reaction with an acid, e.g., any of those given above.

The compounds of Formula I stimulate the central nervous system in mammals and animals, e.g., mice, rats and birds; they antagonize convulsions and prevent death resulting from the administration of nicotine to mice.

DETAILED DESCRIPTION

It is to be understood that the invention is not to be limited to the exact details of operation or exact compositions shown and described herein, as obvious modifications and equivalents will be apparent to those skilled in the art, and the invention is therefore to be limited only by the scope of the appended claims.

PREPARATION 1

*2-phenylacrylophenone (or 1,2-diphenyl-2-propen-1-one) (II)*

A solution of 294 g. (1.5 moles) of phenyl benzyl ketone (also known as desoxybenzoin), 360 ml. of 37% formaldehyde, and 7.5 ml. of piperidine in 1.35 l. of methanol in a 5 l. flask is stirred under reflux for about 3 hours and allowed to stand for about 16 hours. The mixture is diluted with 2 l. of water and the resulting oil extracted with 2 l. of ether in 2 portions. The ether solutions are washed successively with 150 ml. of aqueous 5% hydrochloric acid solution, 200 ml. of 5% aqueous sodium bicarbonate solution, 300 ml. of water, saturated aqueous sodium chloride solution, and dried over sodium sulfate. After filtration, the solvent is evaporated and the resulting syrup distilled from a Claisen flask to give 266.6 g. (85% yield) of 2-phenylacrylophenone (II) as a colorless oil having a boiling point of 205 to 207° C. (at 15 mm. of Hg). This material crystallizes and is stable at 0° C.

Following the procedure of Preparation 1, but substituting for phenyl benzyl ketone the following:

(1) phenyl p-chlorobenzyl ketone,
(2) p-bromophenyl p-bromobenzyl ketone,
(3) m-chlorophenyl m-chlorobenzyl ketone,
(4) p-fluorophenyl benzyl ketone,
(5) p-chlorophenyl p-methylbenzyl ketone,
(6) o-propylphenyl o-bromobenzyl ketone,
(7) o-bromophenyl m-ethylbenzyl ketone,
(8) m-fluorophenyl p-butylbenzyl ketone,
(9) p-methylphenyl p-methylbenzyl ketone,
(10) o-butylphenyl p-butylbenzyl ketone, etc., there can be prepared, respectively, (1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc.

EXAMPLE 1

*2-phenyl-3-(3-quinuclidinylamino)-propiophenone (I)*

To a solution of 25 g. (0.126 mole) of 3-aminoquinuclidine dihydrochloride (III) and 25.4 g. (0.252 mole) of triethylamine in 100 ml. of methanol, 26.2 g. (0.126 mole) of 2-phenylacrylophenone (II) is added. After standing for about 5 days at room temperature the solution is concentrated to dryness and the residue dissolved in cold dilute hydrochloric acid. The acid solution is washed with ether and basified with cold aqueous sodium hydroxide solution. The resulting oil is extracted with ether; the extract is washed with water, saturated sodium chloride solution and dried over sodium sulfate. Filtration of the ether solution and evaporation of the ether gives 36 g. of a syrup that crystallizes on standing and melts at 90 to 95° C. This material is recrystallized from 100 ml. of ethyl acetate to yield 19 g. (45% yield) of white crystalline 2-phenyl-3-(3-quinuclidinylamino)-propiophenone (I), having a melting point of between 98.5 and 100° C.

The addition of a diethyl ether solution of hydrogen chloride, hydrogen bromide, sulfuric acid, phosphoric acid, acetic acid, benzoic acid, salicylic acid, citric acid, succinic acid, malic acid, cyclohexanesulfamic acid, or trichloroacetic acid, etc. to an ethanol solution of 2-phenyl-3-(3-quinuclidinylamino)-propiophenone (I) (or any of the compounds of Formula I shown in the next paragraph), followed by the addition of about four volumes of diethyl ether, gives the corresponding acid addition salt.

Following the procedure of Example 1, but substituting for 2-phenyl acrylophenone (II) the following:

(1) 2-(p-chlorophenyl)acrylophenone (II),
(3) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc., there can be prepared, respectively, (1) 2-(p-chlorophenyl)-3-(3-quinuclidinylamino)-propiophenone (I),
(2) 2-(p-bromophenyl)-3-(3-quinuclidinylamino)-4'-bromopropiophenone (I),
(3) 2-(m-chlorophenyl)-3-(3-quinuclidinylamino)-3'-chloropropiophenone (I),
(4) 2-phenyl-3-(3-quinuclidinylamino)-4'-fluoropropiophenone (I),
(5) 2-(p-methylphenyl)-3-(3-quinuclidinylamino)-4'-chloropropiophenone (I),
(6) 2-(o-bromophenyl)-3-(3-quinuclidinylamino)-2'-propylpropiophenone (I),
(7) 2-(m-ethylphenyl)-3-(3-quinuclidinylamino)-2'-bromopropiophenone (I),
(8) 2-(p-butylphenyl)-3-(3-quinuclidinylamino)-3'-fluoropropiophenone (I),
(9) 2-(p-methylphenyl)-3-(3-quinuclidinylamino)-4'-methylpropiophenone (I),
(10) 2-(p-butylphenyl)-3-(3-quinuclidinylamino)-2'-butylpropiophenone (I), etc.

Modes of administration and dosages of the products of Formula I of this invention for use as central nervous system stimulants are analogous to those disclosed in U.S. Pat. 3,203,962.

I claim:
1. A compound selected from the group consisting of (1) a compound of the formula

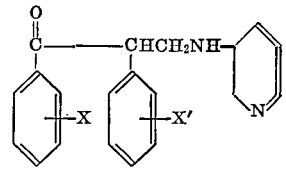

wherein X and X' are selected from the group consisting of hydrogen, lower-alkyl, fluorine, chlorine, and bromine, and (2) an acid addition salt thereof.

2. A compound of claim 1 wherein X and X' are hydrogen, namely, 2 - phenyl - 3-(3-quinuclidinylamino)-propiophenone.

References Cited

UNITED STATES PATENTS 3,203,962   8/1965   Huebner _____ 260—326.5

NORMA E. MILESTONE, Primary Examiner

S. D. WINTERS, Assistant Examiner

U.S. Cl. X.R.

260—293.4, 294, 590; 424—267